United States Patent
Schechinger et al.

(10) Patent No.: US 7,703,120 B2
(45) Date of Patent: Apr. 20, 2010

(54) SET-TOP BOX INITIATED CONTACT CENTER INTERACTION

(75) Inventors: Paul Schechinger, Londonderry, NH (US); Steven Morrison, Sunnyvale, CA (US); John Hernandez, San Jose, CA (US); Michael P. Lepore, Marlborough, MA (US); Paul Russell, Clinton, MA (US); Jay Ferrandini, Haverhill, MA (US); William Finnerty, Leominster, MA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 11/520,332

(22) Filed: Sep. 13, 2006

(65) Prior Publication Data

US 2008/0066127 A1   Mar. 13, 2008

(51) Int. Cl.
*H04N 7/173* (2006.01)
*G06F 7/04* (2006.01)
*G06F 17/30* (2006.01)

(52) U.S. Cl. .................. 725/105; 725/110; 725/51; 709/225; 709/227; 726/26; 726/27; 726/28; 726/29; 726/30

(58) Field of Classification Search .......... 725/132, 725/144
See application file for complete search history.

(56) References Cited

U.S. PATENT DOCUMENTS

| | | | |
|---|---|---|---|
| 6,317,883 B2 | 11/2001 | Marics | |
| 6,393,490 B1* | 5/2002 | Stiles et al. | 719/313 |
| 6,657,990 B1* | 12/2003 | Dilip et al. | 370/352 |
| 6,871,323 B2 | 3/2005 | Wagner et al. | |
| 6,941,574 B1 | 9/2005 | Broadwin et al. | |
| 7,257,552 B1* | 8/2007 | Franco | 705/28 |
| 2002/0085705 A1* | 7/2002 | Shires | 379/265.04 |
| 2002/0156797 A1* | 10/2002 | Lee et al. | 707/200 |
| 2004/0244056 A1* | 12/2004 | Lorenz et al. | 725/135 |
| 2005/0028206 A1 | 2/2005 | Cameron et al. | |
| 2005/0066365 A1* | 3/2005 | Rambo | 725/51 |
| 2006/0004627 A1 | 1/2006 | Baluja | |

* cited by examiner

*Primary Examiner*—Dominic D Saltarelli
*Assistant Examiner*—Robert Hance
(74) *Attorney, Agent, or Firm*—Michael C. Stephens, Jr.; Trellis IP Law Group, PC

(57) ABSTRACT

In one embodiment, a method can include: (i) receiving a contact center interaction request via a device coupled to a display screen; (ii) accessing information about the device or a user of the device from a customer database of a content provider; and (iii) establishing an interaction path between the contact center and a viewer. The method can further include providing information to the user via the interaction path in response to a request by the user for the information. The device can be a set-top box (STB) or a cable card and the display screen can be a television, for example. Also, the content provider can be a cable or satellite television provider, for example.

20 Claims, 4 Drawing Sheets

SET-TOP BOX INITIATED CONTACT CENTER INTERACTION

TECHNICAL FIELD

The present disclosure relates generally to contact-center interaction.

BACKGROUND

Contact centers can allow for a matching of an agent to a contact such that the contact or customer's needs can be met. Conventionally, such interaction may be via a customer-initiated telephone call, such as by a customer calling a contact center to request help. However, conventional methods of contact center interaction may be too restrictive or possibly too inefficient for meeting many customer needs.

OVERVIEW

In one embodiment, a method can include: (i) receiving a contact center interaction request via a device coupled to a display screen; (ii) accessing information about the device or a user of the device from a customer database of a content provider; and (iii) establishing a an interaction path between the contact center and the user. The method can further include providing information to the user via the interaction path in response to a request by the user for the information. The device can be a set-top box (STB) or a cable card and the display screen can be a television, for example.

In another embodiment, an apparatus can include: (i) a content provider configured to receive a contact center interaction request via a device coupled to a display screen, where the contact center interaction request is in response to a prompt; (ii) logic configured to access information about the device or a user of the device from a customer database of a content provider; and (iii) logic configured to establish an interaction path between the contact center and a viewer. The content provider can be a cable or satellite television provider, for example.

DESCRIPTION OF EXAMPLE EMBODIMENTS

Particular embodiments can provide a system and method for interaction between a television viewer or user and a contact center. Such interaction may be via a callback from the contact center to the viewer's telephone, for example. Alternatively, a customer may directly interact using the customer's television equipped with a suitable set-top box (e.g., for cable or satellite television). Further, context information can be exchanged between the viewer and the contact center via the television.

Advantages of particular embodiments include: (i) facilitation of contact initiation by a viewer in response to a television commercial or suitable non-commercial content, for example; (ii) increased accuracy in measuring the effectiveness of television commercials; (iii) availability of call context information, such as information about the television viewer and the specific commercial watched; and (iv) the ability to provide informational videos or form data via transmission from the contact center to the viewer's television set. Further, demographic information can be collected based on data or customer information from cable company subscriber databases, for example.

Particular embodiments can include solutions whereby a television viewer, in response to instructions, prompts, or other suitable indicators, on a television screen, presses a specific button on the television's remote control, and is either connected to a contact center via the television, or a call is automatically initiated from the contact center to a telephone of the television viewer.

Figure 1:
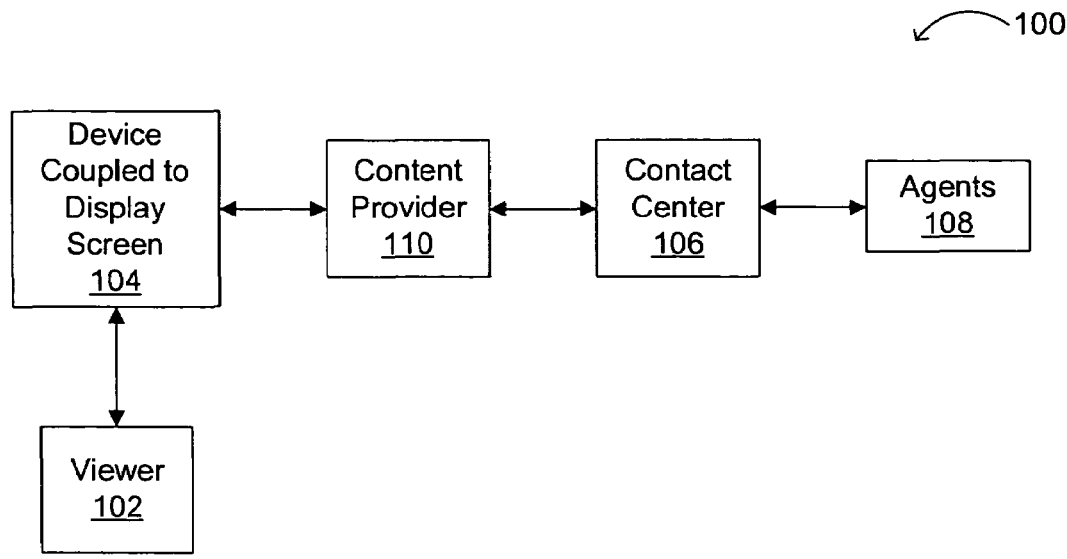
FIG. 1 depicts an example initiated contact structure.

Referring now to FIG. 1, an example initiated contact structure is indicated by the general reference character 100. Viewer or user 102 can control device coupled to display screen 104, such as by using a remote control. The device can be a set-top box (STB) or a cable card, for example. Content provider 110 can interface with device coupled to display screen 104, as well as contact center 106. Contact center 106 can interface with agents 108, where such agents can include any resources configured to service customer needs. For example, agents can include people or automated resources.

Conventionally, during a television commercial, a telephone number is given, and the viewer must then call that telephone number in order to reach the contact center. However, particular embodiments can facilitate interaction as initiated by a television viewer. In addition, information about the television viewer can be sent to the contact center, such as the name and address of the viewer, and which commercial or advertisement the viewer was watching when initiating interaction with the contact center.

Once a contact session is initiated, the contact center can manually or automatically send information (e.g., videos and/or form data) to the television set of the viewer initiating interaction. Such an exchange of information can make for a richer interaction between the contact center and the customer, and can also allow an advertiser to collect statistics about those responding to their particular television commercial.

Figure 2:
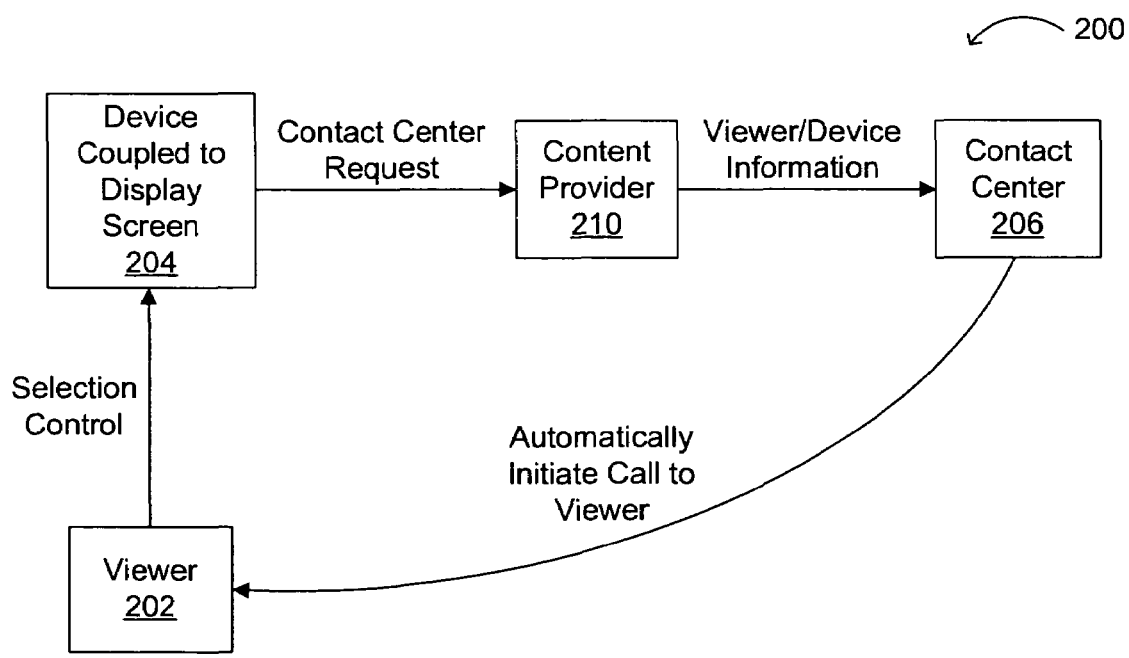
FIG. 2 depicts an example automatic callback flow.

Referring now to FIG. 2, an example automatic callback flow is indicated by the general reference character 200. Viewer 202 can use a selection control (e.g., a remote control) to access device coupled to display screen 204. Such a device can be an STB or a cable card, and the display screen can be a television, for example. A contact center request can be sent to content provider 210. Content provider 210 may be a cable or satellite television provider, for example.

Content provider 210 can include a database with customer information, such as telephone numbers for callback, as well as information about each viewer's STB. Contact center 206 can receive viewer/device information from content provider 210, and contact center 206 may automatically initiate a call to viewer 202 in response. While device information is shown as being sent to contact center 206 in the particular example of FIG. 2, such device information may alternatively be translated within content provider 210, and such translated information (e.g., a name, phone number, address contact media preference, or the like) can be sent along to contact center 206. Thus, a viewer can simply press a button on the viewer's remote control and a call facilitating direct contact center interaction can be automatically made to the viewer. In this fashion, a viewer can act when seeing a commercial (e.g., an advertisement or a connectable item within an entertainment program) simply by pressing a remote control button.

Figure 3:
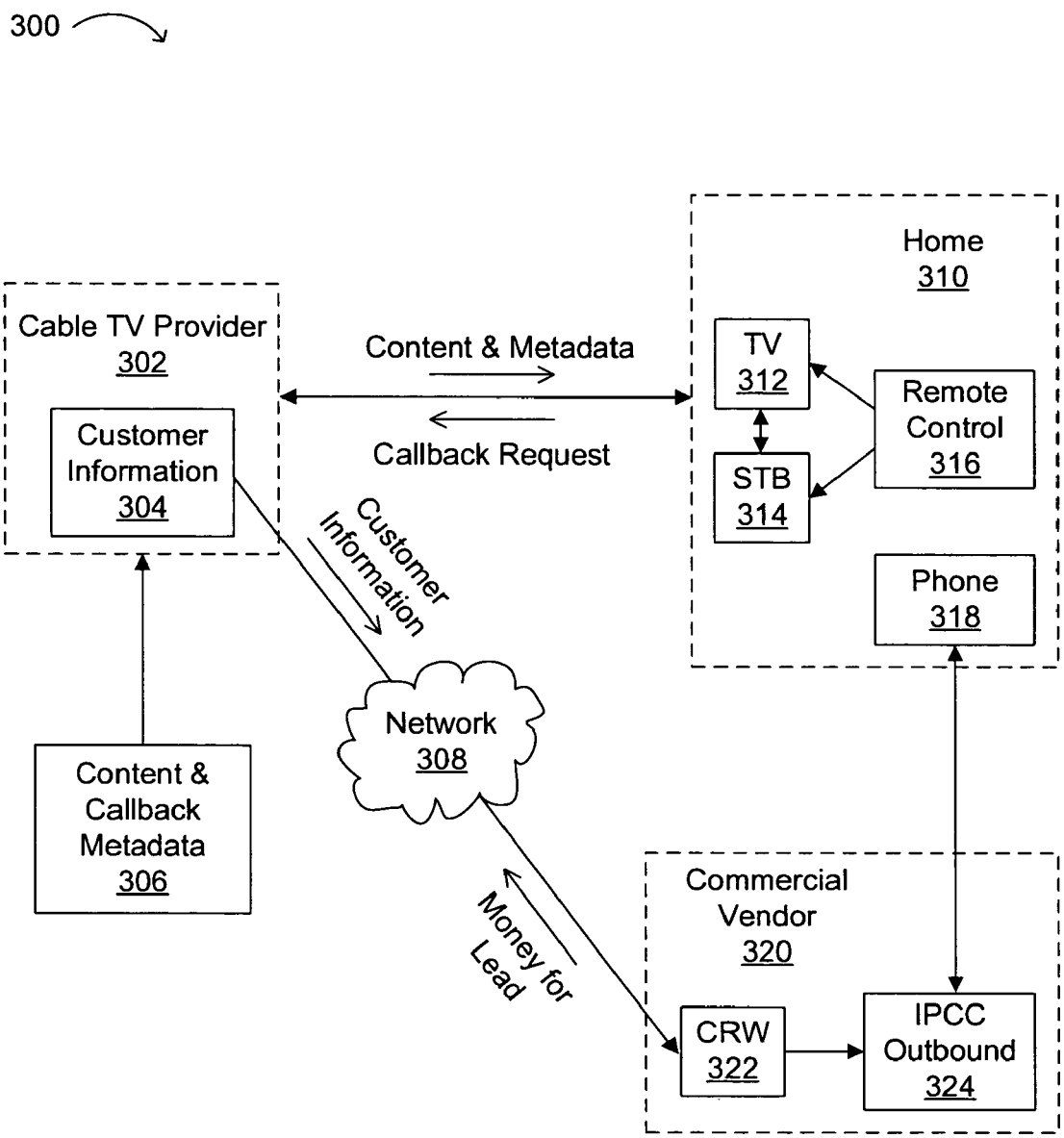
FIG. 3 depicts an example callback flow using a set-top box (STB).

Referring now to FIG. 3, an example callback flow using a set-top box (STB) is indicated by the general reference character 300. Cable television (TV) provider 302 can include customer information (e.g., a database) 304. In some applications, this database and/or associated interaction mechanics may be outsourced to a third party instead of remaining with a content provider. Such customer information can include telephone numbers and/or information about STBs (e.g., STB 314) or other associated devices, for example. Content and callback metadata 306 can provide content (e.g., the science fiction channel) to cable television provider 302. Alternatively, the content may originate from cable television provider 302, for example. Such metadata can include vendor uniform resource locator (URL) information, or other data that may be needed by a user. For example, metadata can include an application to allow connectable items to be accessed by the user or viewer while clicking on a specific part of a display screen.

Home 310 can include TV 312, and STB 314 coupled to TV 312. Alternatively, a cable card may be integrated with TV 312 to provide similar STB functionality. Also, remote control 316 can control TV 312 and/or STB 314. Remote control 316 can be used to request interaction with a contact center (e.g., by pressing a designated button). Also, home 310 can include phone 318. Of course, phone 318 maybe a traditional phone or a mobile (e.g., cellular) phone.

When a contact center interaction request (e.g., a "callback" request) is received by cable TV provider 302, a database of customer information 304 may be searched. Such customer information (e.g., the number of phone 318) can be transported via network 308 to commercial vendor 320. Network 308 can be any suitable network, such as a public network (e.g., the Internet), or a private network (e.g., a virtual private network (VPN)). Commercial vendor 320 can include callback request web-service (CRW) 322, as well as an internet protocol contact center (IPCC) outbound 324, for example. Of course, other suitable outbound dialing systems (e.g., non-IP based) may also be used in particular embodiments. IPCC outbound 324 can then place a call to phone 318 using customer information 304, for example. In this fashion, direct interaction between a viewer (e.g., located in home 310) and a contact center (e.g., IPCC outbound 324) can be established.

Figure 4:
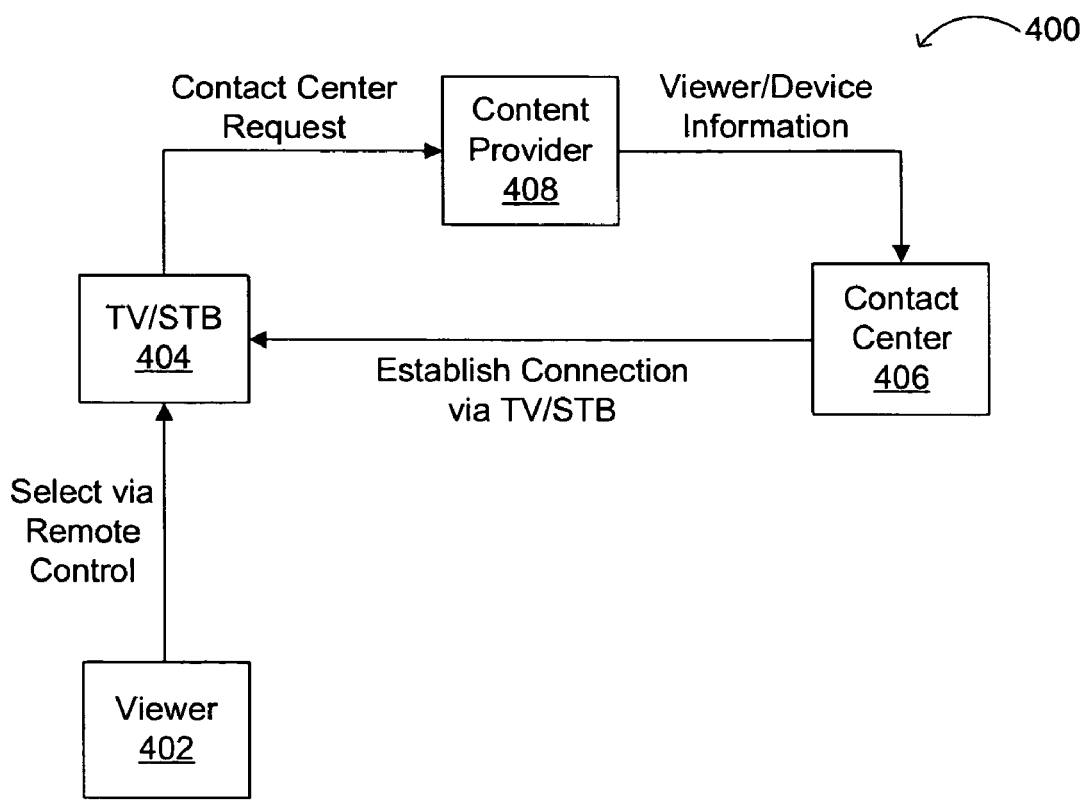
FIG. 4 depicts an example contact center interaction flow using an STB.

Referring now to FIG. 4, an example contact center interaction flow using an STB is indicated by the general reference character 400. Viewer 402 can make a contact center interaction request by appropriately selecting using a remote control, for example. TV/STB 404 can receive the contact center interaction request, and forward on to content provider 408. Content provider 408 can then obtain viewer/device information from a customer database, and then provide this information to contact center 406. Then, contact center 406 can establish a connection via TV/STB 404 to enable direct interaction between viewer 402 and contact center 406.

Figure 5:
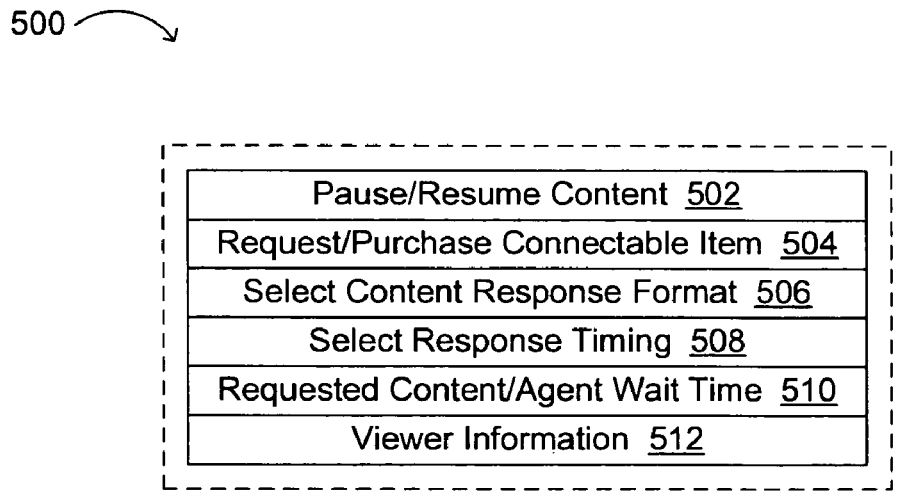
FIG. 5 depicts example feature mechanics for contact center interaction using an STB.

Referring now to FIG. 5, example feature mechanics for contact center interaction using an STB are indicated by the general reference character 500. Feature mechanics implementations in particular embodiments can include, for example, converting metadata in a content stream into an on-screen prompt to let a viewer know of possible available action to take. One such feature mechanic can be pause/resume content 502. In particular embodiments, a viewer may pause existing content (e.g., an ongoing television show) while the viewer-initiated contact is underway. Such content may then be resumed once the contact session has been completed. Alternatively, particular embodiments can include automated pausing during interaction such that the viewer or user would not have to remember to explicitly pause content.

Another such feature mechanic can be request/purchase connectable item 504. In particular embodiments, a viewer can select a "connectable item," which can be any item in the video and/or audio content that the viewer can purchase and/or request information about. The viewer may associate a metadata stream with any content type (e.g., commercial or non-commercial) that may contain information used to identify a connectable item in which a consumer might have interest. The viewer can identify items and/or concepts of interest, and may initiate a contact request and/or purchase of that item. Also, a listing of connectable items can be provided during or after content concludes.

Another such feature mechanic can be select content response format 506. In particular embodiments, a user or viewer can select a format of content responses. Such formats can include instant messaging (IM), e-mail, telephone, and video, for example. Thus, a display device in particular embodiments can be a computer monitor. In such a case, customer information can be searched by an Internet-based service subscribed to by the customer, for example.

Another such feature mechanic can be select response timing 508. In particular embodiments, a viewer can select timing for the response. Contact requests and/or additional information video or other content can be placed in a queue for that viewer for future access. For example, if a consumer wishes to learn more about a truck seen in a television commercial, the consumer can bookmark such additional truck content. Alternatively, the consumer can make a contact request and then return to the consumer's queue at a later time so as to not interrupt current programming. Also, particular embodiments can allow for available scheduling to be controlled by the content provider. For example, the content provider may wish to restrict when the callback can occur such that the viewer does not miss specific or immediately following content.

Another such feature mechanic can be requested content/agent wait time 510. In particular embodiments, feedback can be provided to the viewer giving an approximate wait time if requested content and/or a suitable agent is not currently available. In some embodiments, such approximate wait times or the like can be automatically provided.

Another such feature mechanic can be viewer information 512. In particular embodiments, a viewer can provide information in addition to the information already found in a customer database (e.g., customer information 304 of FIG. 3). For example, the viewer might wish to be called back on a cellular phone instead of on a home phone. In this case, the viewer may provide the callback number of the cellular phone as viewer information 512. Alternatively, a user or viewer may wish to block certain information from the automatic customer database search. Thus, viewer information 512 may also be utilized to block specified viewer information.

Figure 6:
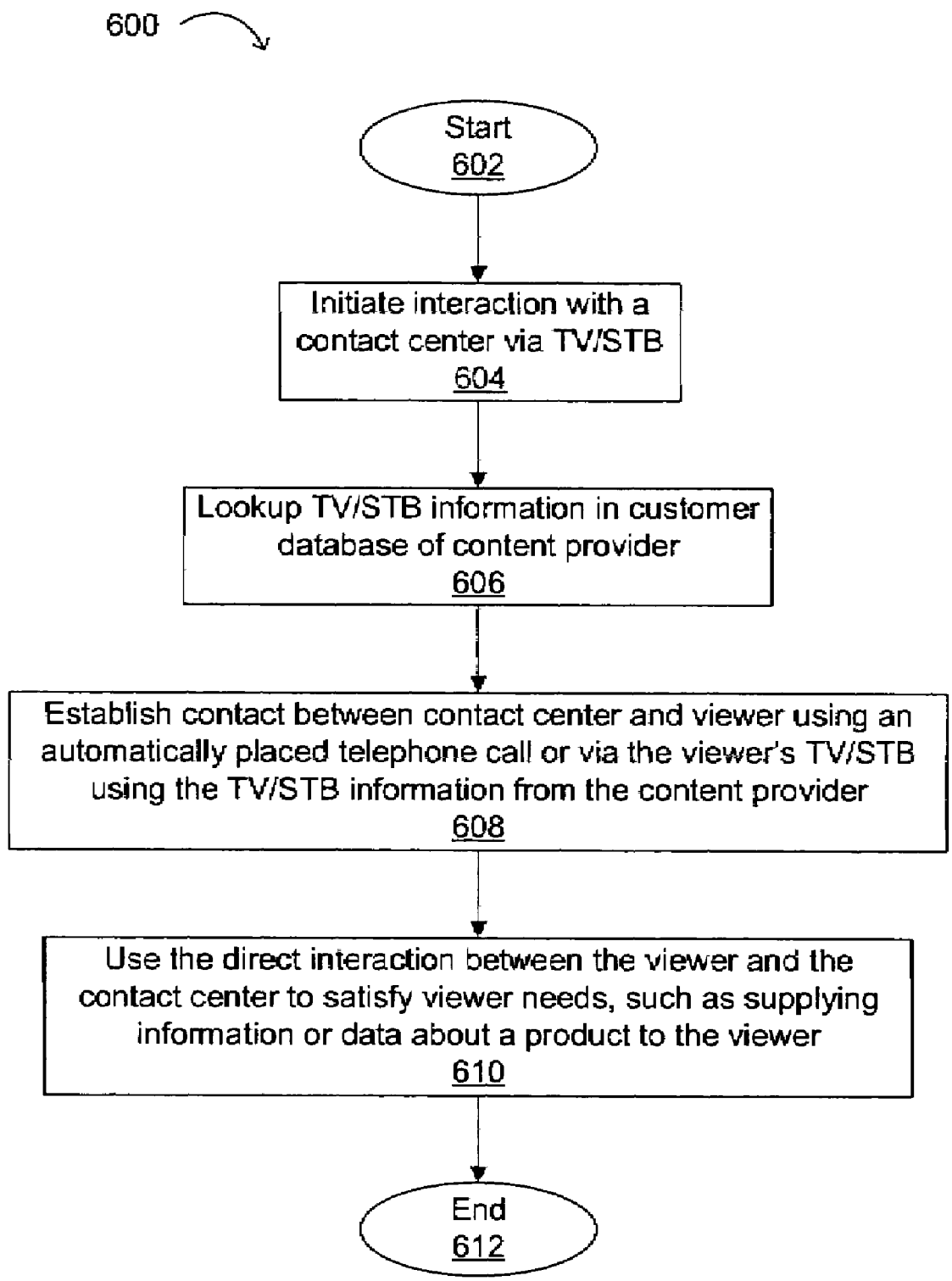
FIG. 6 depicts a simplified flow chart of a method of interacting with a contact center using an STB.

Referring now to FIG. 6, a simplified flow chart of a method of directly interacting with a contact center using an STB is indicated by the general reference character 600. The flow can begin (602) and interaction with a contact center can be initiated via a TV/STB (604). Next, a lookup of TV/STB information in a customer database of a content provider can be performed (606). As discussed above, such information can also include telephone numbers, or other customer information, as well as device information (e.g., about an STB). Alternatively, in particular embodiments, such customer information can include a customer profile including likes and dislikes, and may not include specific device information.

A contact can be established between a contact center and a viewer using an automatically placed telephone call, or via the viewer's TV/STB (608). In either case, information about the TV/STB or the telephone number can be retrieved from a customer database, such as may be located in, or associated with, a content provider. The direct interaction between the viewer and the contact center can then be used to satisfy viewer needs, such as supplying information or data about a product to the viewer (610), and the flow can complete (612).

In this fashion, apparatus and/or methods for direct interaction by a TV viewer to a contact center can be provided. Such interaction may be via a callback from the contact center to the viewer's telephone, for example. Alternatively, a customer may directly interact using the customer's television equipped with a suitable STB. Further, context information can be exchanged between the viewer and the contact center via the TV.

Although set-top boxes, cable cards, and content providers are primarily described herein, it will be understood that other types of devices and/or providers may be appreciated by persons skilled in the art. For example, any type of device amenable to signals converted to/from a display screen can be accommodated in accordance with particular embodiments. Also, such devices may be integrated with the display screen in particular embodiments. Further, any suitable controllers, or other general types of remote controls, can be employed in accordance with particular embodiments.

Although particular embodiments have been described, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment", "particular embodiments," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," "in a particular embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Further, distributed, or networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as examples, and not as limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
    receiving an interaction request via a device coupled to a display screen, wherein the interaction request comprises a response format selection that indicates a format in which a user of the device is to be contacted by a contact center, a response timing selection that indicates when the user is to be contacted by the contact center, and a customer information adjustment selection for designating block information about the user to be excluded in establishing an interaction path between the contact center and the user;
    accessing predetermined customer information about the device or the user of the device by searching a customer database of a content provider in response to the received interaction request, wherein information used for the searching of the customer database is at least partially blocked using the designated block information; and
    sending the accessed customer information to the contact center for use in the establishing of the interaction path between the contact center and the user, the interaction path being in the selected response format and with the selected response timing.

2. The method of claim 1, further comprising providing content related information to the user via the interaction path in response to a request by the user for the content related information.

3. The method of claim 2, wherein the request by the user for the content related information comprises selecting a connectable item from content displayed on the display screen.

4. The method of claim 1, wherein the receiving the interaction request comprises receiving a signal from a remote control, the remote control being the device coupled to the display screen.

5. The method of claim 1, wherein the interaction path comprises a telephone connection between the contact center and the user.

6. The method of claim 5, wherein the establishing the interaction path comprises automatically placing a call from the contact center to the user to establish the telephone connection, the call being automatically placed at the selected response time.

7. The method of claim 1, wherein the device comprises at least one of a set-top box (STB) and a cable card.

8. The method of claim 7, wherein the display screen comprises a television.

9. The method of claim 7, wherein the content provider comprises at least one of a cable television provider and a satellite television provider.

10. The method of claim 1, wherein the display screen comprises a computer monitor.

11. An apparatus, comprising:
    a processor; and
    logic encoded in one or more tangible media for execution by the processor, and when executed operable to:
        receive an interaction request via a device coupled to a display screen, wherein the interaction request comprises a response format selection that indicates a format in which a user of the device is to be contacted by a contact center, a response timing selection that indicates when the user is to be contacted by the contact center, and a customer information adjustment selection for designating block information about the user to be excluded in establishing an interaction path between the contact center and the user;
        access predetermined customer information about the device or the user of the device by searching a customer database of a content provider in response to the received interaction request, wherein information used for the searching of the customer database is at least partially blocked using the designated block information; and
        send the accessed customer information to the contact center for use in the establishing of the interaction path between the contact center and the user, the interaction path being in the selected response format and with the selected response timing.

12. The apparatus of claim 11, wherein the logic when executed is further operable to provide content related information to the user via the interaction path in response to a request by the user for the content related information.

13. The apparatus of claim 11, wherein the interaction request comprises a signal generated from a remote control, the remote control being the device coupled to the display screen.

14. The apparatus of claim 11, wherein the interaction path comprises a telephone connection between the contact center and the user.

15. The apparatus of claim 14, wherein the telephone connection is configured to be established automatically by placing a call from the contact center to the user, the call being automatically placed at the selected response time.

16. The apparatus of claim 11, wherein the device comprises at least one of a set-top box (STB) and a cable card.

17. The apparatus of claim 16, wherein the display screen comprises a television.

18. The apparatus of claim 16, wherein the content provider comprises at least one of a cable television provider and a satellite television provider.

19. The apparatus of claim 11, wherein the display screen comprises a computer monitor.

20. An apparatus for contact initiation, the apparatus comprising:

at least partially hardware means for receiving an interaction request via a device coupled to a display screen, wherein the interaction request comprises a response format selection that indicates a format in which a user of the device is to be contacted by a contact center, a response timing selection that indicates when the user is to be contacted by the contact center, and a customer information adjustment selection for designating block information about the user to be excluded in establishing an interaction path between the contact center and the user;

at least partially hardware means for accessing predetermined customer information about the device or the user of the device by searching a customer database of a content provider in response to the received interaction request, wherein information used for the searching of the customer database is at least partially blocked using the designated block information; and at least partially hardware means for sending the accessed customer information to the contact center for use in the establishing of the interaction path between the contact center and the user, the interaction path being in the selected response format and with the selected response timing.

* * * * *